(12) United States Patent
Chiba

(10) Patent No.: US 7,496,274 B2
(45) Date of Patent: Feb. 24, 2009

(54) COMMUNICATION APPARATUS AND COMMUNICATION METHOD

(75) Inventor: Shunichi Chiba, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 698 days.

(21) Appl. No.: 11/232,828

(22) Filed: Sep. 22, 2005

(65) Prior Publication Data

US 2006/0078281 A1    Apr. 13, 2006

(30) Foreign Application Priority Data

Sep. 27, 2004    (JP) .............................. 2004-280471

(51) Int. Cl.
*H04N 7/00*    (2006.01)
*H04N 5/91*    (2006.01)

(52) U.S. Cl. .......................................... 386/46; 386/68

(58) Field of Classification Search .................. 386/46, 386/68, 67, 125, 124, 52
See application file for complete search history.

(56) References Cited

U.S. PATENT DOCUMENTS

2001/0008575 A1 * 7/2001 Rho et al. ..................... 386/69

2004/0008770 A1 * 1/2004 Okada et al. ........... 375/240.02

FOREIGN PATENT DOCUMENTS

| JP | 2002-203363 | 7/2002 |
|----|-------------|--------|
| JP | 2002-298551 | 10/2002 |
| JP | 2003-22604 | 1/2003 |
| JP | 2003-299008 | 10/2003 |

* cited by examiner

*Primary Examiner*—Robert Chevalier
(74) *Attorney, Agent, or Firm*—Blakely, Sokoloff, Taylor & Zafman LLP

(57) ABSTRACT

According to one embodiment, a communication apparatus comprises a measuring section adapted to transfer and record one or more files stored in a storage region in the recording device registered via the communication section and network, measure recording time from the start to the end of recording, and then, transfer the recorded file, thereby measuring transfer time from the start to the end of transfer. The communication apparatus further comprises a control section which divides capacity of the file by the recording time.

18 Claims, 8 Drawing Sheets

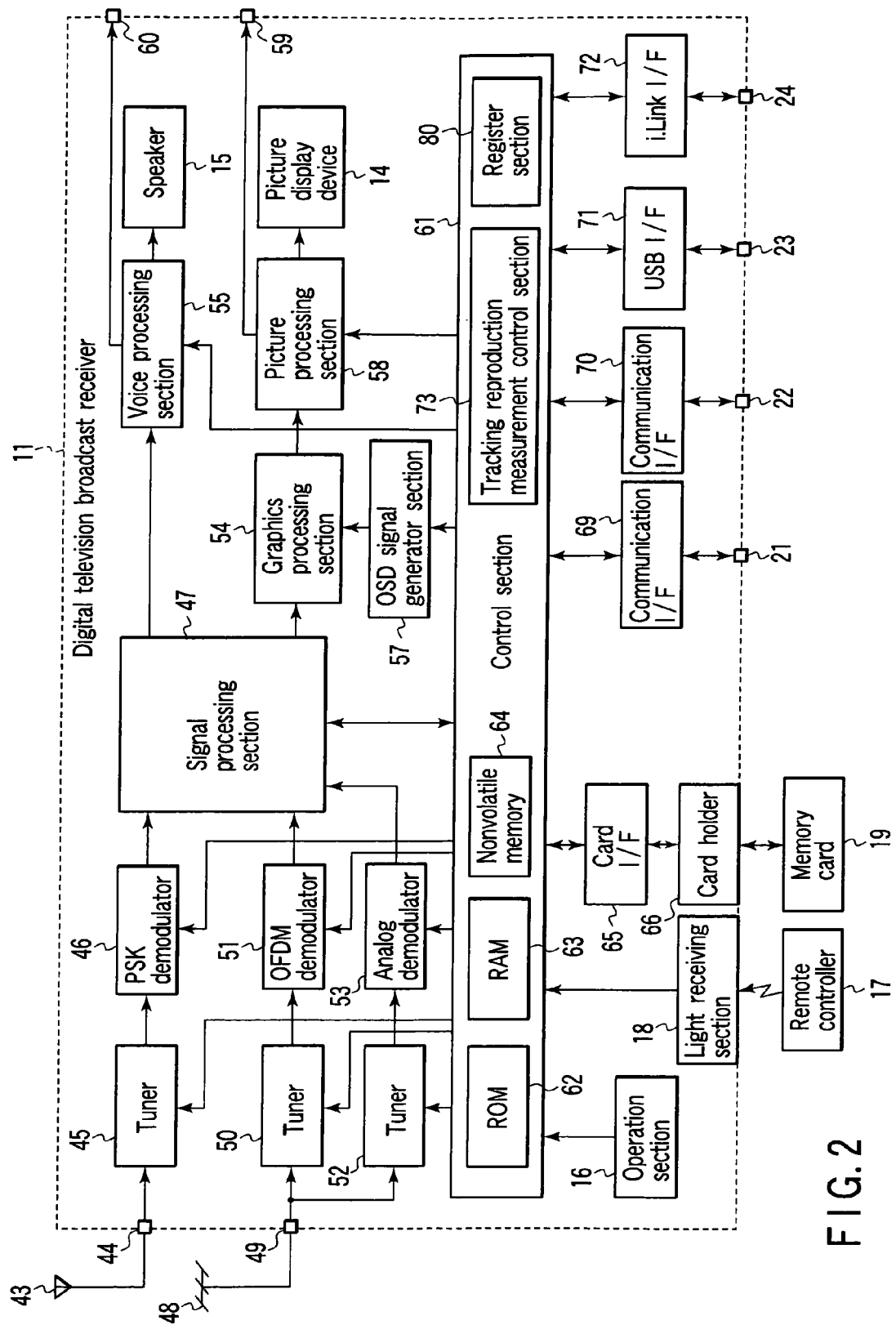
F I G. 2

Tracking reproduction process in the following picture
recording mode can be carried out at current speed

| HD | SD |
|---|---|

| XP | SP |
|---|---|

| LP | EP |
|---|---|

Reproduction speed : 12.9 Mbps

FIG. 6

Tracking reproduction process in the following picture recording mode can be carried out at current speed

| XP | SP |
|---|---|
| LP | EP |

Reproduction speed: 9.4 Mbps

Picture recording process in the following picture recording mode can be carried out at current speed

| HD | SD |
|---|---|
| XP | SP |
| LP | EP |

Reproduction speed: 11.9 Mbps

FIG. 7

COMMUNICATION APPARATUS AND COMMUNICATION METHOD

CROSS-REFERENCE TO RELATED APPLICATIONS

This application is based upon and claims the benefit of priority from the prior Japanese Patent Application No. 2004-280471, filed Sep. 27, 2004, the entire contents of which are incorporated herein by reference.

BACKGROUND

1. Field

Embodiments of the present invention relate to a communication apparatus such as a television apparatus having a network function, and more particularly, to a communication apparatus and a communication method for carrying out tracking reproduction, in other words "playback," while recording a picture signal in a recording apparatus over a network.

2. Description of the Related Art

As well known, in recent years, digitization of a television broadcast has been promoted. For example, in Japan, there has been started a terrestrial digital broadcast as well as satellite digital broadcasts such as a broadcasting satellite (BS) digital broadcast and a 110-degree communication satellite (CS) digital broadcast.

In such a digital broadcast receiver which receives a digital television broadcast, it becomes possible to digitally record a received program and to reproduce a recorded program by connecting a digital recording device having a large capacity such as, a hard disk drive (HDD).

Such a digital broadcast receiver can handle picture or voice information as a digital signal, and thus, has a function of displaying, for example, digital data acquired by a digital camera as a number of photos recorded in a memory card. In Japan Pat. Appln. KOKAI Publication No. 2003-299008, a technique is disclosed for easily selecting and displaying a user's desired image file from a number of photos recorded in a memory card.

However, this technique is unable to stably transmit and record picture or voice signals, which are digital signals from a built-in tuner in and in a hard disk recorder which exists over a network via, for example, the network. In particular, it is impossible to know at what speed communications can be carried out when picture and voice signals or the like are transmitted to each recording device which exists over a network are transmitted from the communication apparatus side such as a television apparatus which provides picture and voice information and in what picture recording mode, tracking reproduction can be carried out as a result of the transmission.

BRIEF DESCRIPTION OF THE SEVERAL VIEWS OF THE DRAWING

FIG. 2 is an exemplary block diagram depicting an example of a configuration of the digital television broadcast receiver according to the embodiment of the invention;

FIG. 6 is a view showing an example of a display screen which shows a picture recording mode in which tracking reproduction can be carried out in the digital television broadcast receiver according to the embodiment of the invention;

FIG. 7 is a view showing an exemplary display screen which shows a picture recording mode in which a tracking reproduction can be carried out and a reproduction mode in which reproduction can be carried out in the digital television broadcast receiver according to the embodiment of the invention.

DETAILED DESCRIPTION

Hereinafter, one embodiment of the present invention will be described with reference to the accompanying drawings. In general, according to one embodiment of the invention, a communication apparatus comprises (i) a communication section, (ii) a register section, (iii) a measuring section and (iv) a control section. Herein, according to one embodiment, the communication section is adapted to establish communications with an external recording device via a network while the register section is adapted to register the recording device over the network for use in a recording process.

As further described, the measuring section is adapted to transfer and record a file stored in a storage region in the recording device and registered in the register section via the communication section and network. The measuring section is further adapted to measure a recording time from the start to the end of recording, and then, to transfer the recorded file from the recording device to the communication apparatus via the communication section, thereby measuring a transfer time from the start to the end of transfer.

The communication apparatus further comprises a control section to divide a capacity of the file by the recording time measured by the measuring section, thereby obtaining a recording speed, and further to divide the capacity of the file by the transfer time measured by the measuring section, thereby obtaining a reproduction speed and to generate a display signal that displays whether to enable or disable tracking reproduction (playback) for carrying out reproduction while carrying out recording by the recording device for a plurality of picture recording modes on the basis of the recording speed and reproduction speed.

Figure 3:
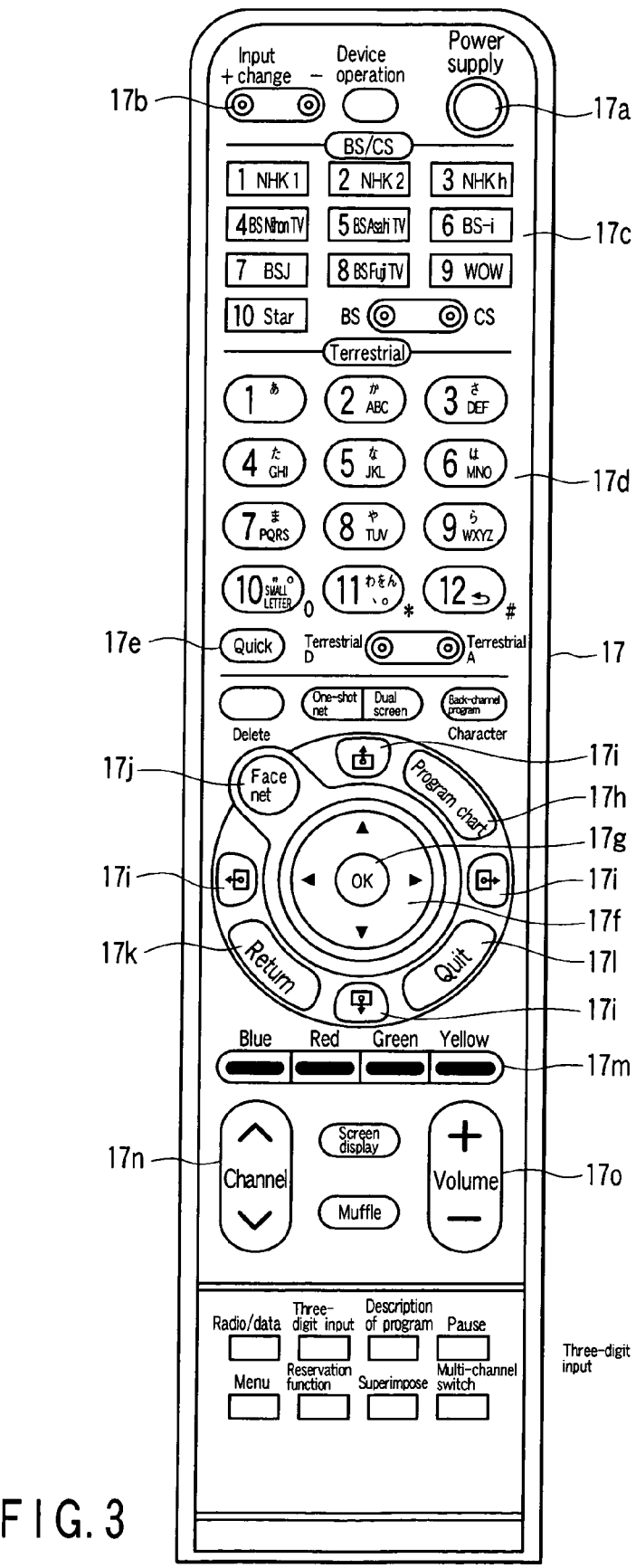
FIG. 3 is an exemplary block diagram depicting an example of a remote controller of the digital television broadcast receiver according to the embodiment of the invention.

I. Television Apparatus Having Network Function Which is Communication Apparatus According to the Present Invention First, an example of a television apparatus having a network function, which is a communication apparatus according to the present invention, will be described below with reference to the accompanying drawings. FIG. 2 is a block diagram depicting an example of a configuration of a digital television broadcast receiver according to one embodiment of the present invention. FIG. 3 is a block diagram depicting an example of a remote controller of the digital television broadcast receiver according to the embodiment of the invention.

That is, a digital television broadcast receiver 11 is mainly composed of a cabinet 12, and a support base 13 which supports the cabinet 12 in an erected manner. On the cabinet 12, there are installed: a flat panel type picture display device 14 composed of, for example, a liquid crystal display panel; a speaker 15; an operating section 16; a light receiving section 18 which receives operational information transmitted from a remote controller 17; and the like.

In addition, on the digital television broadcast receiver 11, for example, there are removably mounted: an secure digital (SD) memory card; a memory card such as an multimedia card (MMC) or a memory stick; and further, a memory card 19 such as, for example, a memory card (IC card) having information recorded therein such as a program or photo.

The digital television broadcast receiver 11 also comprises, a first local area network (LAN) terminal 21, a second LAN terminal 22, a universal serial bus (USB) terminal 23, and an I.LINK® terminal 24.

Among them, the first LAN terminal 21 is used as a LAN compatible HDD exclusive port. The first LAN terminal 21 is used to record and reproduce information via a packet-based network (e.g., Ethernet network) (to and from a LAN compatible HDD 25, which is a connected network attached storage (NAS).

In this way, the first LAN terminal 21 is provided as a LAN compatible HDD exclusive port, whereby program information can be stably recorded with a high vision image quality in the HDD 25 without being affected by another network environment, a network use state and the like.

In addition, the second LAN terminal 22 is used as a general LAN compatible port using the packet-based network. For example, the second LAN terminal 22 is used to connect devices such as a LAN compatible HDD 27, a personal computer (PC) 28, an HDD built-in digital versatile disk (DVD) recorder 29, and the like, and to transmit information to these devices.

With respect to the DVD recorder 29, digital information communicated via the second LAN terminal 22 is control information. Thus, there is a need for providing an exclusive analog transmission channel 30 in order to transmit analog picture and voice information to the digital television broadcast receiver 11.

Further, the second LAN terminal 22 is used to establish a connection to a network 32 such as, for example, the Internet via a broadband router 31 connected to a hub 26, and to transmit information to a computer (PC) 33, a portable phone 34 and the like via the network 32.

The above-identified USB terminal 23 is used as a general USB compatible port. For example, this USB terminal 23 is used to connect USB devices such as a portable phone 36, a digital camera 37a, a card reader/writer 38 for a memory card, an HDD 39, and a keyboard 40 via, for example, a hub 35, and to transmit information to these USB devices.

Further, the above I.LINK® terminal 24 is used to serially connect, for example, an AV-HDD 41 and a D-VHS (Digital-Video Home System) 42 or the like, and to transmit information to these devices.

FIG. 2 shows a main signal processor system of the above digital television broadcast receiver 11. That is, a satellite digital television broadcast signal received by an antenna 43 for receiving a BS/CS digital broadcast is supplied to a tuner 45 for satellite digital broadcasting via an input terminal 44, whereby a broadcast signal of a desired channel is channel-selected.

Then, the broadcast signal, which has been channel-selected by the tuner 45, is supplied to a phase shift keying (PSK) demodulator 46. The supplied signal is demodulated to a digital picture signal and a digital voice signal, and then, the demodulated signals are outputted to a signal processing section 47.

In addition, a terrestrial digital television broadcast signal received by an antenna 48 for receiving a terrestrial broadcast is supplied to a tuner 50 for terrestrial digital broadcasting via an input terminal 49, whereby a broadcast signal of a desired channel is channel-selected.

Then, the broadcast signal, which has been channel-selected by the tuner 50, is supplied to an orthogonal frequency division multiplexing (OFDM) demodulator 51. The supplied signal is demodulated to a digital picture signal and a digital voice signal, and then, the demodulated signals are outputted to the signal processing section 47.

A terrestrial analog television broadcast signal received by the antenna 48 for receiving a terrestrial broadcast is supplied to a tuner 52 for terrestrial analog broadcasting via the input terminal 49, whereby a broadcast signal of a desired antenna is channel-selected. Then, the broadcast signal, which has been channel-selected by the tuner 52, is supplied to an analog demodulator 53. The supplied signal is demodulated to an analog picture signal and an analog voice signal, and then, the demodulated signals are outputted to the signal processing section 47.

Here, the signal processing section 47 selectively applies to predetermined digital signal processing to the digital picture signal and voice signal supplied from the PSK demodulator 46 and OFDM demodulator 51, respectively. The processed signals are output to a graphic processing section 54 and a voice processing section 55.

Further, the graphic processing section 54 has a function of superimposing and outputting an OSD signal generated by an on-screen-display (OSD) signal generator section 57 on the digital picture signal supplied from the signal processing section 47. The graphic processing section 54 can selectively output an output picture signal of the signal processing section 47 and an output OSD signal of the OSD signal generator section 57, or can output both of outputs in combination so as to a half of a screen, respectively.

Then, the digital picture signal output from the graphic processing section 54 is supplied to a picture processing section 58. The picture processing section 58 converts an input digital picture signal to an analog picture signal in a format that can be displayed by the picture display device 14. Thereafter, the graphic processing section outputs the converted signal to the picture display device 14, displays as a picture, and outputs the signal external to the digital television broadcast receiver 11 via an output terminal 59.

The voice processing section 55 converts an inputted digital voice signal to an analog voice signal in a format that can be reproduced by the speaker 15. Thereafter, the voice processing section outputs the converted signal to the speaker 15, reproduces the outputted signal as a voice, and outputs the reproduced signal to the outside via an output terminal 60.

For this embodiment, in the digital television broadcast receiver 11, all operations including a variety of receiving operations described above are integrally controlled by a control section 61. The control section 61 comprises a central processing unit (CPU), volatile and/or non-volatile memory and the like. The control section 61 receives operational information from the operating section 16 or receives operational information sent out from the remote controller 17, and controls each section such that the contents of the operation are reflected.

In this case, the control section 61 comprises a read only memory (ROM) 62 having stored therein a control program executed by a CPU of the control section 61; a random access memory (RAM) 63 which provides a work area to the CPU; and a non-volatile memory 64 in which a variety of setting information, control information and the like are stored.

The control section 61 is connected to a card holder 66 to which the memory card 19 can be mounted via a card interface (I/F) 65. In this manner, the control section 61 can transmit information to the memory card 19 mounted on the card holder 66 via the card I/F 65. Further, a second memory card (not shown) is removably connected to the control section 61 via a card I/F and a card holder not shown. In this manner, the control section 61 can transmit information to the second memory card.

The control section 61 is also connected to the first LAN terminal 21 via a communication I/F 69. In this manner, the control section 61 can transmit information to the LAN compatible HDD 25 coupled to the first LAN terminal 21 via the communication I/F 69. In this case, the control section 61 features a. dynamic host configuration protocol (DHCP) server function, and makes control by assigning an Internet protocol (IP) address to the LAN compatible HDD 25 connected to the first LAN terminal 21.

Figure 1:
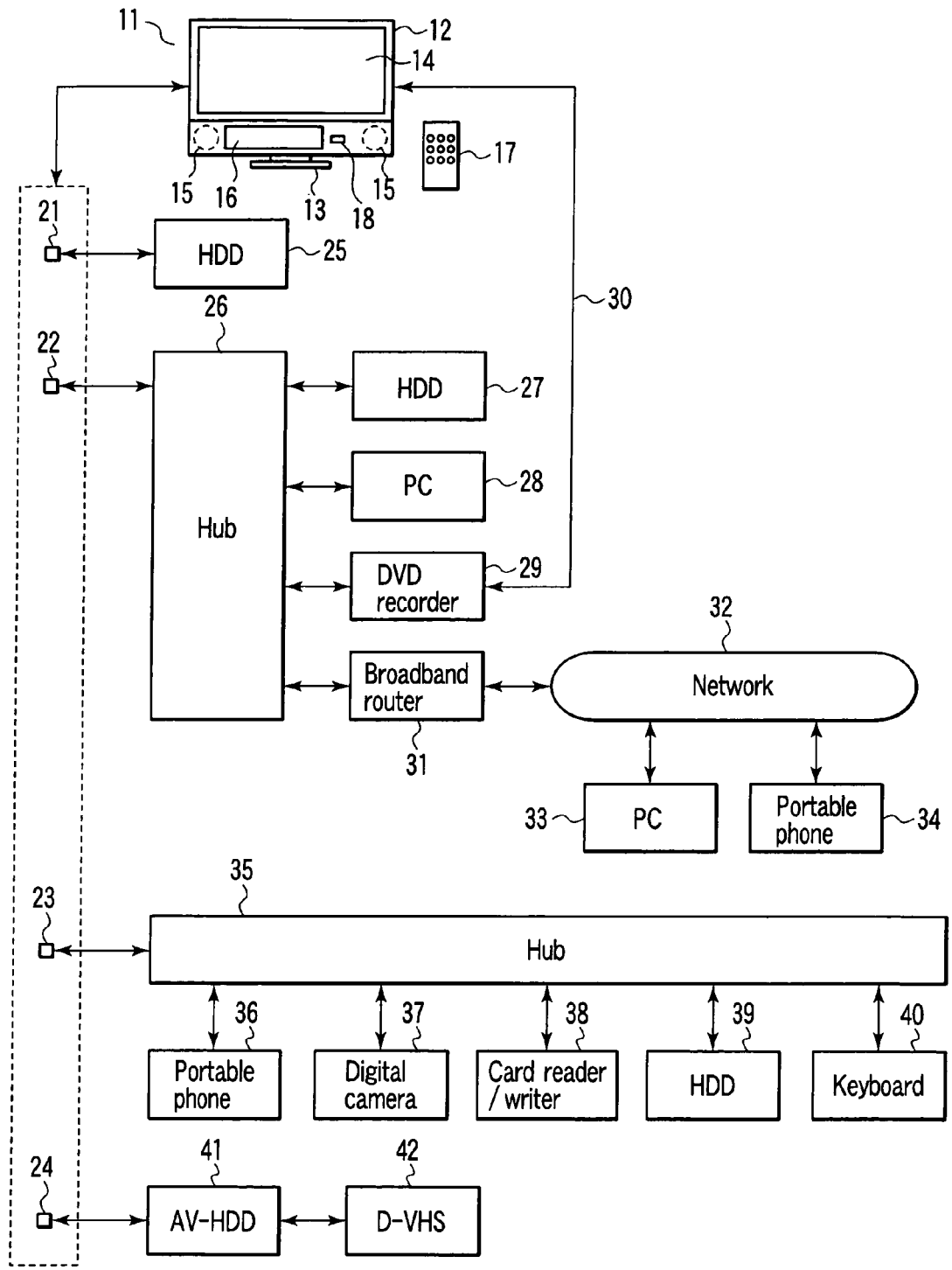
FIG. 1 is an explanatory diagram schematically illustrating an example of a digital television broadcast receiver and a network system main composed of the receiver according to one embodiment of the present invention.

The control section 61 is further coupled to the second LAN terminal 22 via a communication I/F 70. In this manner, the control section 61 can transmit information to each device (refer to FIG. 1) coupled to the second LAN terminal 22 via the communication I/F 70.

Furthermore, the control section 61 is coupled to the USB terminal 23 via a USB I/F 71. In this manner, the control section 61 can transmit information to each device (refer to FIG. 1) coupled to the USB terminal 23 via the USB I/F 71.

Moreover, the control section 61 is connected to the I.LINK® terminal 24 via an I.LINK® I/F 72. In this manner, the control section 61 can transmit information to each device (refer to FIG. 1) coupled to the I.LINK® terminal 24 via the I.LINK® I/F 72.

Further, the control section 61 comprises a register section 80 and a measurement control section 73. The register section 80 registers a recording and reproducing device for carrying out a recording and reproducing process over a network. The measurement control section 73 measures a recording speed for recording a file in an arbitrary recording and reproducing device. The control section 61 also carries out a measuring process, which will be described later in detail.

FIG. 3 shows an exemplary construction of the remote controller 17. The remote controller 17 is mainly provided with a power supply key 17a, an input change key 17b, direct channel selector keys 17c for satellite digital broadcast channels, direct channel selector keys 17d for terrestrial broadcast channels, a quick key 17e, cursor keys 17f, an OK key 17g, a program chart key 17h, page change keys 17i, a face net (navigation) key 17j, a return key 17k, a quit key 17l, blue, red, green, and yellow color keys 17m, channel up and down keys 17n, a volume control key 17o, a menu key 17p, and the like.

Figure 4:
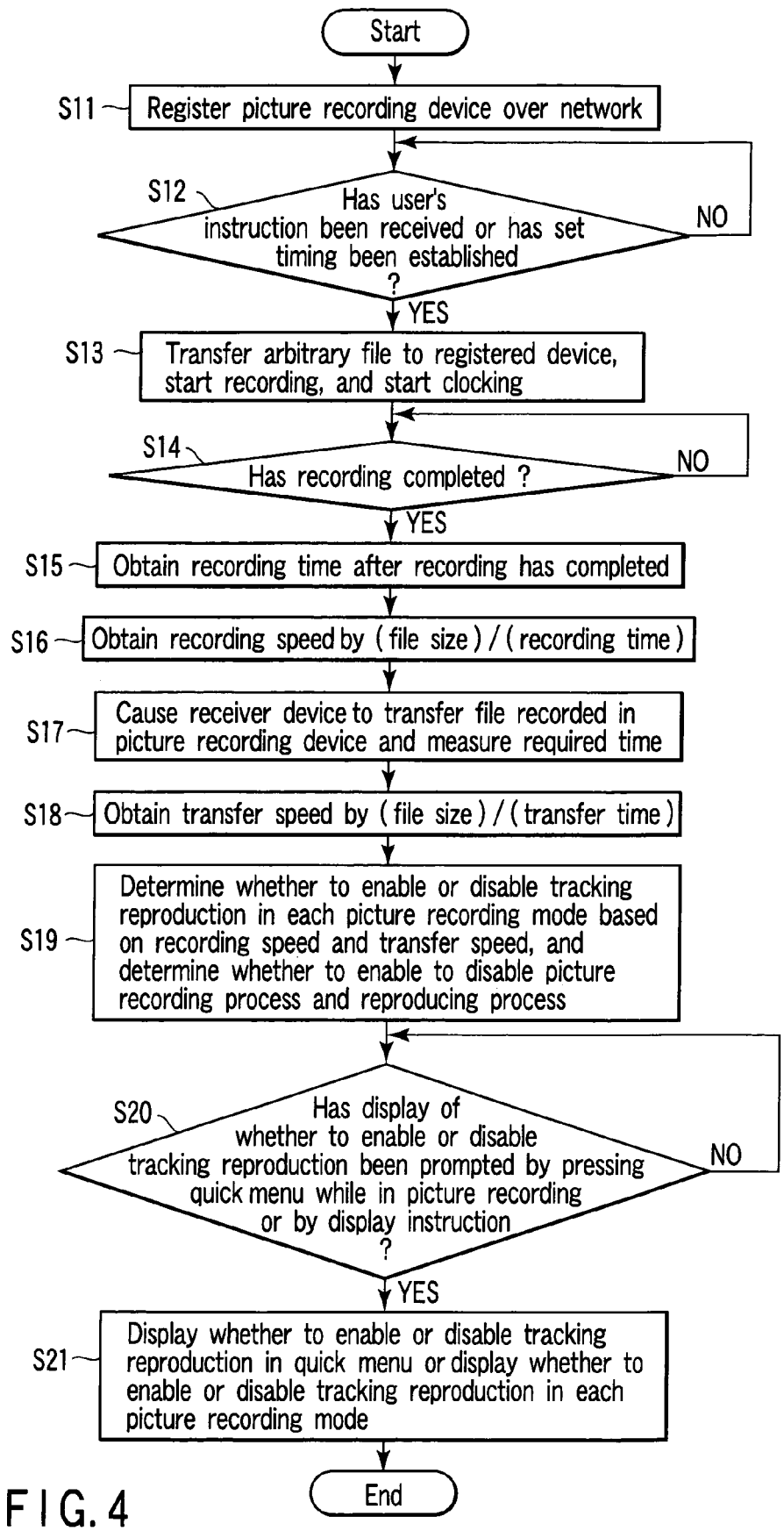
FIG. 4 is an exemplary flow chart showing an example of a measuring process in the digital television broadcast receiver according to the embodiment of the invention.
Figure 5:
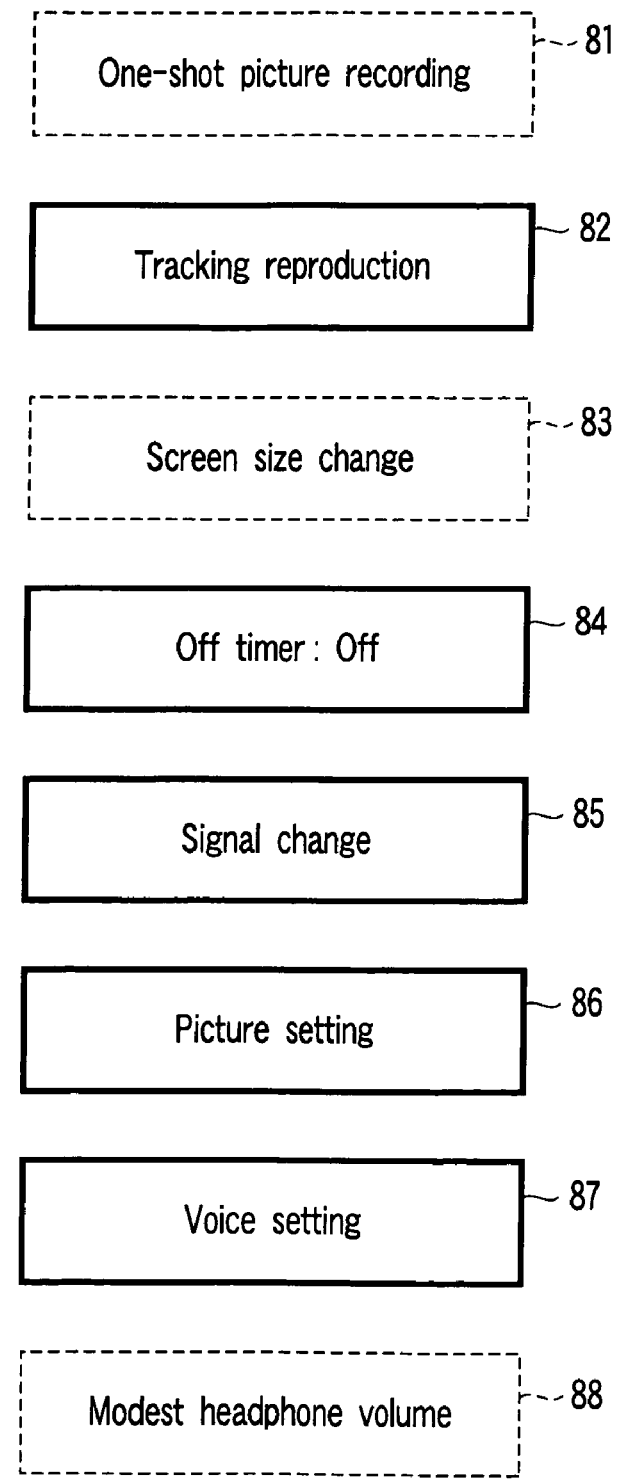
FIG. 5 is a view showing an example of a display screen which shows an example of a quick menu in the digital television broadcast receiver according to the embodiment of the invention.
Figure 8:
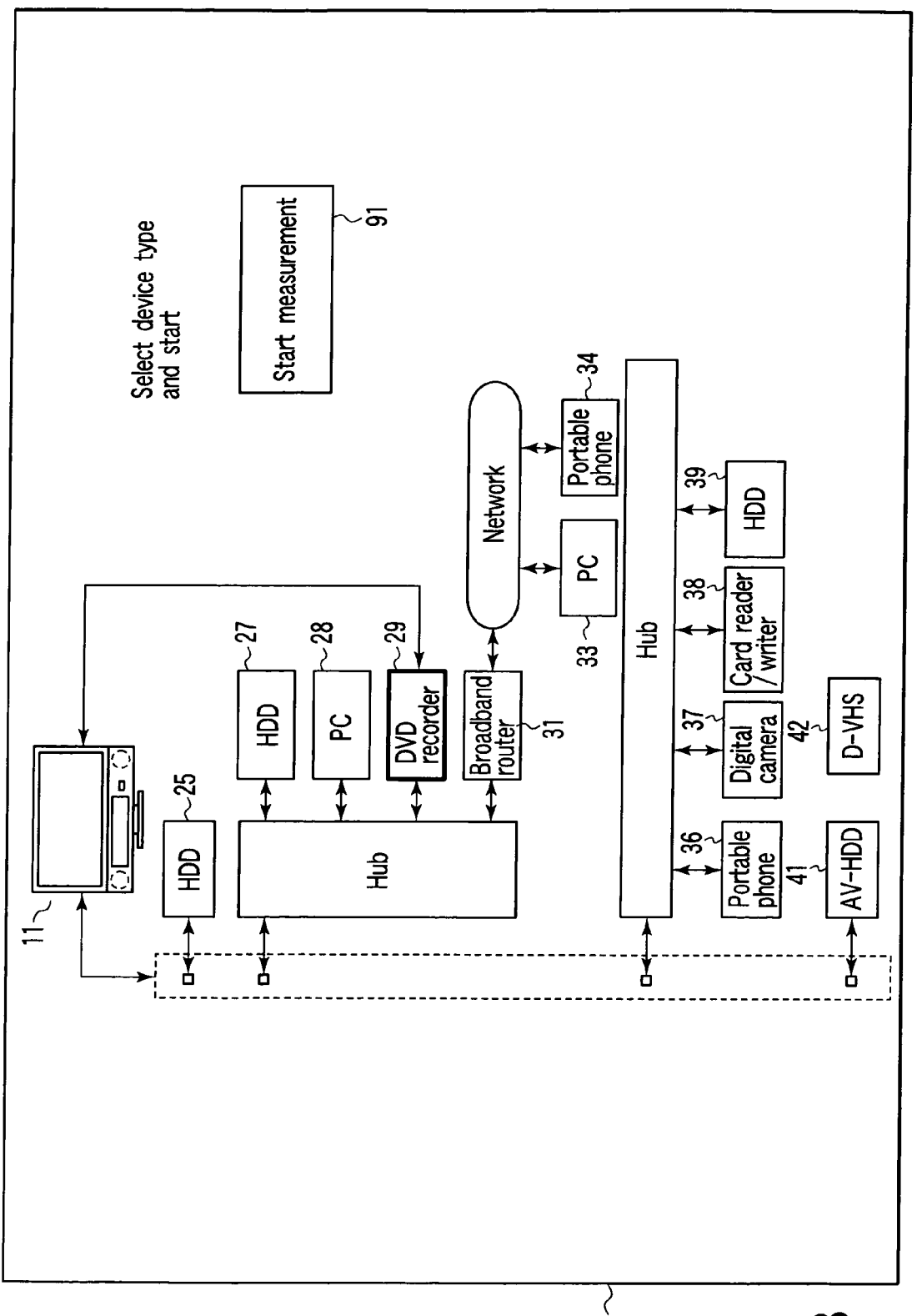
FIG. 8 is an illustrative view illustrating an example of a display screen for specifying a picture recording device in the digital television broadcast receiver according to the embodiment of the invention.

II. Process of Measuring Recording Speed and Reproduction Speed for Tracking Reproduction Now, a process of measuring a recording speed and a reproduction speed for tracking reproduction in the digital television broadcast receiver 11, which is a communication apparatus having such a configuration will be described below in detail with reference to the accompanying drawings. FIG. 4 is an exemplary flow chart showing an example of a measuring process in the digital television broadcast receiver according to the embodiment of the invention. FIG. 5 is a view showing an example of a display screen which shows an example of a quick menu in the digital television broadcast receiver according to the embodiment of the invention. FIG. 6 is a view showing an example of a display screen which shows a picture recording mode in which tracking reproduction can be carried out in the digital television broadcast receiver according to the embodiment of the invention. FIG. 7 is a view showing an example of a display screen which shows a picture recording mode in which a tracking reproduction can be carried out and a reproduction mode in which reproduction can be carried out in the digital television broadcast receiver according to the embodiment of the invention. FIG. 8 is an illustrative view illustrating an example of a display screen for specifying a picture recording device in the digital television broadcast receiver according to the embodiment of the invention.

First, as shown in the exemplary flow chart of FIG. 4, in the digital television broadcast receiver 11, the register section 80 of the control section 61 registers a device for picture recording over the network (S11). Thus, this method is, for example, for automatically determining a device having a picture recording function with its lowest registration number over the network by default setting. It is also possible to manually determine the device by a user's operation.

In this case, as shown in FIG. 8, the picture display section 14' of the digital television broadcast receiver 11 displays a network chart around the broadcast receiver 11. For example, according to one embodiment, it is also preferable to specify the recording device 29 over the network on the screen by using the page change keys 17i or the like of the remote controller 17. At this time, it is preferable that an icon of the recording device 29 is made different from icons of other recording devices in terms of color tone or edge line, and the specified icon is displayed to be visually identified.

On such a register screen 14', an icon 91 "start measurement" is selected and a Return key is pressed. Alternatively, if a timing preset in the control section 61 occurs, measurement is started (S12 of FIG. 4). The timing used here is preferable to be, for example, a timing at which a network configuration has been changed, and it is preferable that the above timing is provided according to an elapsed date and time set such as once per week.

When measurement is started, an arbitrary test file stored in a storage region of the measurement control section 73 or the like is read out by an action of a program etc. incorporated in the measurement control section 73. Then, the read-out test file is transferred to a recording device (for example, a storage region such as a hard disk drive incorporated in the DVD recorder 29 of FIG. 1) over the network registered in advance, recording is started, and clocking is started (S13 of FIG. 4). When the test file has been recorded in the recording device (S14 of FIG. 4), clocking is terminated, and a recording time is obtained (S15 of FIG. 4). Then, a recording speed is obtained by an action of the measurement control section 73, for example, by (file size)/(recording time) (S16 of FIG. 4).

Further, the file recorded in the recording device over the network is transferred to the receiver device 11, and a required time for transfer is measured (S17 of FIG. 4). Similarly, a transfer speed is obtained by (file size)/(transfer time) (S18 of FIG. 4). The transfer speed is obtained as a reproduction speed when picture and voice signals are reproduced by the recording device. That is, in the case where picture and voice signals in a high image quality mode has been reproduced, the capacity is too large to catch up total transfer capability of a network or a communication apparatus, and reproduction may be disabled. Thus, only a picture recording mode (reproduction mode) in a range permitted by the transfer speed is available.

Therefore, determination is made as to whether to enable or disable tracking reproduction in each picture recording mode on the basis of the recording speed and transfer speed obtained by the above-described method, and determination is also made as to whether to enable or disable a picture recording process and a reproducing process (S19). Information as to what picture recording mode or the like exists in the recording and reproducing apparatus and what degrees of recording speed and transfer speed are requested for tracking reproduction in each mode, are preferably provided via the network as an information signal sent from the recording and reproducing apparatus 29 to the digital television broadcast receiver 11, but not limited thereto.

When a quick menu display is prompted by an operation of the remote controller 17 during picture recording, a quick menu is displayed to indicate operating icons 81 to 88 as shown in FIG. 5. This screen displays whether or not to enable tracking reproduction according to the previously described determination according to the display of the icon 82. That is, the icons 81, 83 and 88, represented by dashed lines, are made inactive to indicate that the above reproduction cannot be carried out currently. The icon 82 indicates that tracking reproduction can be carried out in a picture recording mode used in current picture recording.

Furthermore, it is preferable to carry out measurement by the operation of the icon 91 "start measurement" on the screen displaying the network chart shown in FIG. 8, and then, indicate a picture recording mode in which a tracking reproduction process can be carried out at a current speed, for example, with the reproduction speed as shown in FIG. 6.

Still furthermore, as shown in FIG. 7, with respect to the tracking reproduction process, it is also preferable to indicate a picture recording mode indicating only (High Quality recording mode), SP (Standard Quality recording mode), LP (Long Time recording mode) and EP (Extra Long time recording mode) without displaying options HD and SD. XP, SP, LP and EP are modes for recording the streaming data transmitted by analog or digital broadcasting, varying in bit rate with XP>SP>LP>EP. The mode "SD" is used to achieve standard picture quality when streaming data by digital broadcasting while HD is used when streaming data is of a higher picture quality (definition).

At the same time, it is also preferable to display a result of determination whether or not a picture recording process in a normal picture recording mode can be carried out other than to display a tracking reproduction process according to a picture recording mode. Yet furthermore, although not shown, it is preferable to similarly display whether to enable or disable a normal reproduction process in each picture recording mode as well as to display tracking reproduction on the screen.

Here, it is preferable to make a display so as to enable visual discrimination such as brightly displaying an icon for a picture recording mode in which picture recording is enabled and darkly displaying an icon for a picture recording mode in which recording is disabled. In addition, as shown in FIG. 5, it is preferable to specifically display a transfer speed, a picture recording speed, and a reproduction speed which are enabled during picture recording on a screen such as, for example, 15.3 Mbps or the like.

The present invention can be achieved by one skilled in the art according to a variety of the above-described embodiments. Further, a variety of modifications of these embodiments can be easily conceived by one skilled in the art, and can be applied to a variety of embodiments even if one does not have inventive ability. Therefore, the present invention covers a broad range without departing from disclosed principles and novel features, and is not limited to the above-described embodiments.

In the above-described communication apparatus, a transfer file prepared for a storage region in a communication apparatus such as a television apparatus is transferred to and recorded in an arbitrary picture recording device which exists over a network, and a communication speed is measured. According to a result of the measurement, it is determined whether to enable or disable a picture recording process in each picture recording mode, and a display screen displays whether to enable or disable the process. In this manner, before actually recording a broadcast such as a television program, it is possible to know in advance a picture recording mode in which picture recording can be carried out in a total ability such as a communication state and a function of a picture recording apparatus. Consequently, it is possible for a user to carry out a picture recording process or a reproducing process in a picture recording mode which is almost the most desirable as long as a given communication environment is permitted.

What is claimed is:

1. A communication apparatus comprising:
   a measuring section adapted to record a file stored in a storage region in a recording device and measure a recording time from a start to an end of recording, and then, to measure a transfer time from a start of a transfer of the recorded file from the recording device to an end of the transfer upon receipt by the communication apparatus; and
   a control section to (i) compute a recording speed being a ratio of a capacity of the file and the recording time measured by the measuring section, and a reproduction speed being a ratio of the capacity of the file by the transfer time measured by the measuring section, and (ii) generate a display signal that displays a plurality of picture recording modes and identifies whether any of the plurality of picture recording modes would concurrently support tracking reproduction on the basis of the measured recording speed and reproduction speed.

2. A communication apparatus according to claim 1 further comprising:
   a communication interface supporting communications with the external recording device via a network;
   a register section to register the recording device over the network for use in a recording process.

3. A communication apparatus according to claim 2, further comprising:
   a tuner to receive a broadcast signal, select a channel, and output a channel selection signal;
   a demodulator to demodulate the channel selection signal from the tuner and to output picture and voice signals; and
   a signal processing section to control the picture and voice signals from the demodulator.

4. A communication apparatus according to claim 1, further comprising:
   a display screen to display a picture in response to the picture and voice signals from the demodulator and the display signal from the control section.

5. A communication apparatus according to claim 1, wherein the plurality of picture recording modes handled by the control section includes at least four recording modes each having a different encoded bit rate.

6. A communication apparatus according to claim 1, wherein the plurality of picture recording modes are displayed on a quick menu.

7. A communication apparatus according to claim 1, wherein the control section identifies disablement of recording by darkening a color of an icon associated with one of the plurality of picture recording modes where recording has been disabled.

8. A communication apparatus according to claim 4, wherein the display signal from the control section causes the recording speed to be displayed on the display screen.

9. A communication apparatus according to claim 8, wherein the control section generates a display signal which displays whether to enable or disable picture recording during a picture recording mode of the plurality of picture recording modes and whether to enable or disable reproduction during a reproduction mode that is occurring contemporaneously with the picture recording mode.

10. A communication apparatus according to claim 8, wherein, on the display screen according to the display signal from the control section, the reproduction speed is displayed together with an icon associated with the reproduction mode.

11. A communication method comprising:
    registering a recording device over a network for use in a recording process;
    transferring a file via the network to and storing the file in a storage region in the registered recording device;
    measuring a recording time from a start to an end of recording, and then, transferring the recorded file from the recording device to the communication apparatus via the network, thereby measuring a transfer time from a start to an end of transfer; and
    dividing a capacity of the file by the measured recording time to obtain a recording speed, and dividing the capacity of the file by the measured transfer time, thereby obtaining a reproduction speed, and generating a display signal that displays a plurality of picture recording modes identifying any of the plurality of picture recording modes able to concurrently support tracking reproduction on the basis of the recording speed and reproduction speed.

12. A communication method according to claim 11, further comprising:
    receiving a broadcast signal, selecting a channel, and outputting a channel selection signal;
    demodulating the channel selection signal and outputting picture and voice signals; and
    controlling the picture and voice signals so as to be transmitted via the network to the registered recording device.

13. A communication method according to claim 11, wherein a picture in response to the picture and voice signals and the display signal is displayed on a display section of a television broadcast receiver.

14. A communication method according to claim 11, wherein the plurality of picture recording modes include at least two picture recording modes that each support a different encoded bit rate.

15. A communication method according to claim 11, wherein the plurality of picture recording modes are XP, SP, LP and EP displayed on a quick menu.

16. A communication method according to claim 11, wherein, on a display screen according to the display signal, the recording speed is displayed together with an icon of the picture recording mode.

17. A communication method comprising:
    measuring a recording time for a file and measuring a transfer time in transferring the recorded file from the recording device to a communication apparatus via the network;
    dividing a capacity of the file by the recording time, thereby obtaining a recording speed;
    dividing the capacity of the file by the transfer time, thereby obtaining a reproduction speed; and
    generating a display signal that displays one or more picture recording modes based on the recording speed and the reproduction speed, and identifies if any of the one or more picture recording modes is able to concurrently support tracking reproduction.

18. A communication method according to claim 17, wherein the display signal is displayed on a display screen communicatively coupled to a television broadcast receiver.

* * * * *